United States Patent
Weber et al.

(10) Patent No.: US 9,401,140 B1
(45) Date of Patent: Jul. 26, 2016

(54) UNSUPERVISED ACOUSTIC MODEL TRAINING

(75) Inventors: Frederick V. Weber, New York, NY (US); Jeffrey C. O'Neill, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 13/592,157

(22) Filed: Aug. 22, 2012

(51) Int. Cl.
- G10L 15/00 (2013.01)
- G10L 15/14 (2006.01)
- G10L 15/22 (2006.01)
- G10L 17/00 (2013.01)

(52) U.S. Cl.
CPC .................................... G10L 15/00 (2013.01)

(58) Field of Classification Search
CPC ......... G10L 19/12; G10L 15/08; G10L 15/00; G10L 15/14; G10L 15/22; G10L 17/00
USPC ......... 704/208, 226, 233, 235, 246, 250, 231, 704/236, 255
See application file for complete search history.

(56) References Cited

U.S. PATENT DOCUMENTS

| | | | | |
|---|---|---|---|---|
| 5,897,616 A * | 4/1999 | Kanevsky | ............... | G10L 17/24 379/88.02 |
| 6,151,575 A * | 11/2000 | Newman | ................. | G10L 15/07 704/231 |
| 7,219,058 B1 * | 5/2007 | Rose | ........................ | G10L 15/08 704/231 |
| 7,660,717 B2 * | 2/2010 | Takiguchi | ............... | G10L 15/30 704/233 |
| 7,813,921 B2 * | 10/2010 | Kobayashi | ............ | G10L 15/065 381/57 |
| 8,121,837 B2 * | 2/2012 | Agapi | ................. | G10L 21/0208 704/233 |
| 8,468,244 B2 * | 6/2013 | Redlich et al. | ................ | 709/225 |
| 8,480,471 B2 * | 7/2013 | Lutnick et al. | .................. | 463/17 |
| 8,571,861 B2 * | 10/2013 | Rose | ....................... | G10L 15/08 379/88.01 |
| 8,738,376 B1 * | 5/2014 | Goel | ........................ | G10L 15/14 704/205 |
| 2003/0182120 A1 * | 9/2003 | Hwang | ................. | G10L 15/063 704/251 |
| 2004/0093210 A1 * | 5/2004 | Toyama | ................... | G10L 15/20 704/233 |
| 2006/0178871 A1 * | 8/2006 | Seltzer | .................. | G10L 15/063 704/205 |
| 2006/0287856 A1 * | 12/2006 | He | ......................... | G10L 15/063 704/256 |
| 2007/0203701 A1 * | 8/2007 | Ruwisch | ............... | G10L 15/065 704/254 |
| 2007/0294082 A1 * | 12/2007 | Jouvet | ................... | G10L 15/005 704/231 |
| 2009/0048841 A1 * | 2/2009 | Pollet | ...................... | G10L 13/07 704/260 |
| 2009/0254349 A1 * | 10/2009 | Hirose | .................. | G10L 13/033 704/260 |
| 2009/0254572 A1 * | 10/2009 | Redlich et al. | .................. | 707/10 |
| 2012/0253811 A1 * | 10/2012 | Breslin | .................... | G10L 17/00 704/249 |
| 2013/0275135 A1 * | 10/2013 | Morales | ................. | G10L 15/065 704/236 |
| 2014/0142944 A1 * | 5/2014 | Ziv | .......................... | G10L 17/02 704/250 |

* cited by examiner

Primary Examiner — Pierre-Louis Desir
Assistant Examiner — Seong Ah A Shin
(74) Attorney, Agent, or Firm — Knobbe, Martens, Olson & Bear, LLP

(57) ABSTRACT

An unsupervised acoustic modeling service for speech recognition is disclosed. A computing device may be present in a listening zone, such as a household or office, and may receive an audio signal that may include speech. In some instances, the speech is not directed to the computing device. Speech recognition results may be generated from the audio signal, using an acoustic model, and the results used to update the acoustic model. For example, the acoustic model may be updated to reflect a particular speaker's pronunciation of certain sound units, such as phonemes. By using speech that is not necessarily directed to the computing device, more data may be available for updating an acoustic model.

38 Claims, 6 Drawing Sheets

UNSUPERVISED ACOUSTIC MODEL TRAINING

BACKGROUND

Current speech recognition systems typically include an acoustic model and a language model. The acoustic model is used to generate hypotheses regarding which sound subword units (e.g., phonemes) correspond to speech based on the acoustic features of the speech. The language model is used to determine which of the hypotheses generated using the acoustic model is the most likely transcription of the speech based on lexical features of the language in which the speech is spoken. The acoustic model and language model are typically configured using training data, including transcriptions known to be correct.

In many current approaches, acoustic models are trained in a supervised manner. In one approach, supervised acoustic model training requires a human speaker to speak a specific sequence of known text. In another approach, the speaker's speech may be captured, transcribed, and then corrected manually by the speaker. One drawback of supervised acoustic model training, among others, is that it can be difficult, time-consuming, and expensive to acquire training data (e.g., human speech) and transcriptions known to be correct. For example, a human may be required both to speak the speech and perform the transcription.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
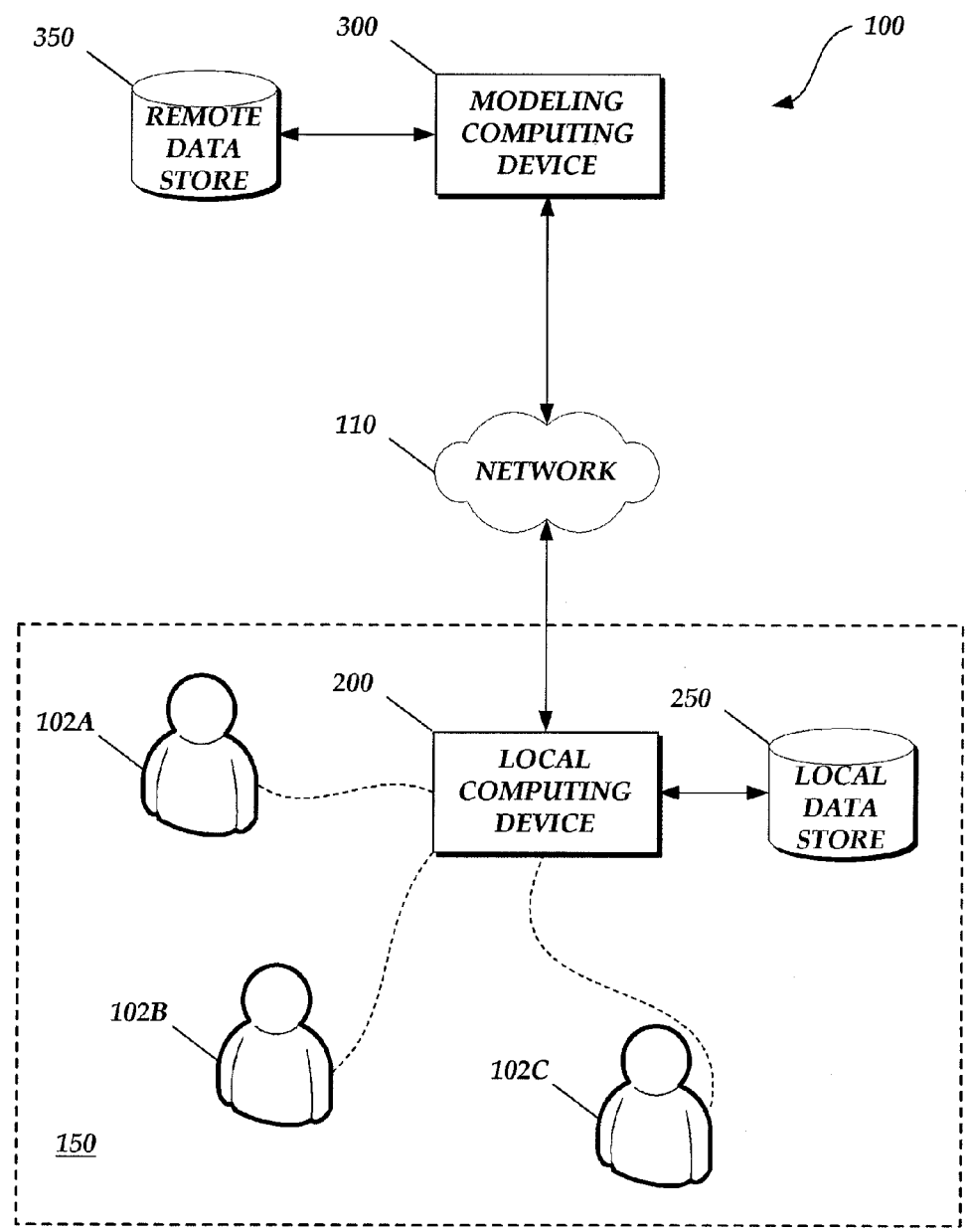
FIG. 1 is an illustrative network environment in which an unsupervised modeling service may operate.

As discussed above, speech recognition may be based on an acoustic model that models the pronunciation of sound units (e.g., phonemes). The accuracy of speech recognition may be improved if an acoustic model is adapted to a particular speaker or one or more speakers having a characteristic in common, such as belonging to a common listening zone (e.g., a household, office, etc.) or having a particular gender or age. The accuracy of speech recognition may also be improved if a significant amount of training data is available to develop the acoustic model.

An acoustic model may generally be thought of as a mapping of acoustic features to word subunits. Specifically, a frame of speech (e.g., a 10 ms portion of the speech) may be described in terms of its acoustic features. These features may include, for example, the energy of the frame over a particular set of frequency bands; comparisons of the energies of these frequency bands to an immediately prior frame (sometimes referred to herein as "deltas"); and other comparisons, including higher level deltas such as second, third, and higher-order derivatives. The features of a frame may be represented as an n-dimensional vector, sometimes referred to herein as a feature vector. Groupings of frames with a particular set of feature vectors may be mapped to a sound unit such as a phoneme. Elements of the acoustic model may be represented as a mixture of Gaussian distributions, sometimes referred to as a Gaussian mixture model. A Gaussian mixture model may include a linear combination of Gaussian (or normal) distributions, each having a weight, a mean, and a variance.

The accuracy of speech recognition may advantageously be improved by updating an acoustic model (e.g., by modifying one or more transformation matrices or Gaussian mixture models) to fit a particular speaker, a particular type of speaker, a particular set of captured speech, or a particular acoustic environment. Accordingly, aspects of the present disclosure pertain to an unsupervised acoustic modeling service, sometimes referred to herein simply as a modeling service. In one embodiment, the modeling service monitors a listening zone continuously for signals that represent sounds. These signals may include speech. The speech may include one or more sound units such as phonemes. A textual transcription (or other set of speech recognition results) of the speech may be generated from the speech using an acoustic model. The subunits of the transcribed text may be aligned with the sound units. The alignments of the sound units and the text subunits may in turn be used to update the acoustic model to generate an updated acoustic model.

Advantageously, no known correct speech recognition results need be provided to the modeling service to update the acoustic model. Rather, confidence levels of the speech recognition results may be determined by the modeling service, and these confidence levels may be used to determine how the acoustic model is updated. These confidence levels may be based on a variety of factors, including the quality of the match between the speech and the current acoustic model, the level of background noise, how well the acoustic model fits a particular speaker or characteristic, and other factors.

The unsupervised acoustic modeling service may associate models with particular individuals. In one embodiment, each speaker has a unique acoustic model assigned to him or her. In another embodiment, an acoustic model is used with one or more speakers having the same gender. In yet another embodiment, an acoustic model is used with one or more speakers in the same household, office, etc. In a still further embodiment, a general acoustic model may be used for all speakers. Upon capturing speech, the modeling service may identify a speaker of a captured utterance, or may identify a characteristic of the speaker (e.g., gender, household, etc.). The modeling service may accordingly select an acoustic model to update based on the speaker, the speaker's gender, or the speaker's household, among other implementations.

In some embodiments, the unsupervised acoustic modeling service is implemented in a distributed computing environment. A local computing device in communication with an audio input device (such as a microphone or receiver, or an array of microphones or receivers) may be provided to monitor sounds an area in which the local computing device is placed, such as a room, apartment, house, car, office, shop, etc. Upon capturing a sound that includes speech, the local computing device may secure the speech by encrypting it, decomposing it and scrambling its constituent sound units, or applying some other type of information security. The secured speech may be transmitted over a network to a modeling computing device, which may use an acoustic model to generate speech recognition results by, for example, transcribing the speech. Features of the speech may be aligned with the transcribed text, with the alignments used to update the acoustic model. The updated model may advantageously provide greater accuracy for subsequent speech recognition.

The distributed computing environment may include one or more computing devices configured with software that acts as an intelligent agent. An intelligent agent may receive a voice query or command from a user that directs the intelligent agent to perform a task in the computing environment, such as retrieving information, setting calendar reminders, conveying audio or video content, etc. An example of an intelligent agent is found in U.S. patent application Ser. No. 12/987,982, titled "Intelligent Automated Assistant," which was filed on Jan. 10, 2011 and published as U.S. Patent Pub. No. 2012/0016678 on Jan. 19, 2012. The disclosure of this patent application is hereby incorporated by reference in its entirety. In one embodiment, the local computing device may capture speech directed to the local computing device, which may include voice queries or voice commands. The local computing device may route these queries or commands to a remote computing device or other computing device for processing, or voice queries or commands may be processed directly at the local computing device. Alternately, the local computing device may process the voice query or command by itself, in part or in whole.

In other embodiments, the unsupervised acoustic modeling service is instead implemented entirely by the local computing device. The local computing device may capture the speech, transcribe it using an acoustic model local to the local computing device, align subunits of the transcribed text with the features, and update the acoustic model originally used to transcribe the text.

FIG. 1 depicts an illustrative network environment 100 in which the modeling service may operate. The network environment 100 may include one or more speakers 102A-102C in a listening zone 150 of the local computing device 200. The local computing device 200 may be in communication with a local data store 250. The local computing device may also be in communication over a network 110 with a modeling computing device 300. The modeling computing device 300 may be in communication with a remote data store 350.

The speakers 102A-102C may be humans that speak in the listening zone 150. The listening zone 150 may represent an area in which speech may be captured by the local computing device 200. For example, the listening zone 150 may be defined by a direction in which a directional microphone of the local computing device 200 is pointed. The listening zone 150 may also represent a room, apartment, house, office, shop, etc. The speakers 102A-102C may be related to the listening zone 150, e.g. as members of a household in which listening zone 150 lies, or as workers in an office in which listening zone 150 lies, among other examples.

The network 110 may be any wired network, wireless network or combination thereof. In addition, the network 110 may be a personal area network, local area network, wide area network, cable network, satellite network, cellular telephone network, or combination thereof. Protocols and devices for communicating via the Internet or any of the other aforementioned types of communication networks are well known to those skilled in the art of computer communications and thus, need not be described in more detail herein.

The local computing device 200 may be any computing device capable of communicating over the network 110 that is also configured to capture speech from the speakers 102A-102C. In some embodiments, the local computing device 200 is represented as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. In other embodiments, the local computing device 200 is represented as a stand-alone device that has some or all of the structure or functionality of any of the example computing devices listed above.

The local computing device 200 may include one or more microphones or receivers to capture or receive speech. In some embodiments, the local computing device 200 includes a directional microphone, such that only speech spoken in certain locations of the listening zone 150 is captured by the local computing device 200. For example, it may be desirable to point a directional microphone of the local computing device 200 away from sources of spurious noise, such as televisions, stereo systems, noisy appliances, and other sources of sound that may interfere with capturing speech. In other embodiments, the local computing device 200 may include an array of microphones.

The local computing device 200 may be configured to store the speech that it captures to a local data store 250 before transmitting it over the network 110 to the remote computing device 300. For example, the local computing device 200 may transmit the speech that it captures in substantially real-time, on an utterance-by-utterance basis. In another example, speech may be periodically transmitted by the local computing device 200 to the remote computing device 300 in batches, for example, in batches of one hundred utterances, one thousand utterances, or any other batch size. Batches need not be of equal size.

The local computing device 200 may further be configured to secure the speech that it transmits over the network 110. For example, encryption or other information security techniques may be used to secure speech, as discussed in further detail below. The local computing device 200 may also (or instead) be configured to transcribe the speech that it captures using an acoustic model, and may also update the acoustic model based on the speech recognition results that it generates.

The local computing device 200 may also be configured to operate as an intelligent agent in response to speech that includes voice commands or queries. For example, the local computing device may be configured to capture speech corresponding to a voice command or query, route the command or query to the remote computing device 300 for processing, and receive the results of the voice command or query for presentation at the local computing device 200. The local computing device 200 may also be configured to process voice commands or queries by itself. Further operations of the local computing device 200 are discussed below with respect to FIG. 2.

The local computing device 200 may be in communication with a local data store 250. The local data store 250 may store one or more acoustic models, and may also store speech captured by the local computing device 200 as discussed above. These acoustic models may be associated with individual speakers 102A-102C or with speakers 102A-102C of a certain gender or age, or may be general-use acoustic models for use with many speakers 102A-102C. The local computing device 200 may, upon capturing or receiving speech, select an acoustic model from the local data store 250, use the selected acoustic model to generate a textual transcription of the speech (or speech recognition results); update the selected acoustic model based on the transcription (or other speech recognition results), and store the updated model in the local data store 250, as discussed in greater detail below with respect to FIG. 4 and FIG. 5B. The local data store 250 may also include information that may be used to identify speakers 102A-102C. For example, information about a speaker's prosody may be maintained in the local data store 250. This information may include information about the speaker's average pitch, pace, inflection, or other aspects of the speaker's speech. This information may also include language models to identify speakers or characteristics of the speaker. For example, a speaker's vocabulary and frequently used words may be used as a proxy for his or her age, as older speakers may use words differently from younger speakers (e.g., the difference in words used by teenagers and adults). In another example, workers in an office may have a vocabulary that relates to business tasks performed by those workers.

The local data store 250 may be embodied in hard disk drives, solid state memories, and/or any other type of non-transitory, computer-readable storage medium accessible to the local computing device 200. The local data store 250 may also be distributed or partitioned across multiple storage devices as is known in the art without departing from the spirit and scope of the present disclosure.

The modeling computing device 300 may generally be any computing device capable of communicating over the network 110. For example, the modeling computing device 300 may be capable of receiving audio signals over the network 110 from the local computing device 200. In some embodiments, the modeling computing device 300 is implemented as one or more server computing devices, though other implementations are possible.

The modeling computing device 300 may be configured to generate speech recognition results from signals that include speech that may be received from the local computing device 200 by using an acoustic model. The modeling computing device 300 may also update the acoustic model based on the speech recognition results that it generates. Further operations of the modeling computing device 300 are discussed below with respect to FIG. 3.

The modeling computing device 300 may be in communication with a remote data store 350. The remote data store 350 may store one or more acoustic models. These acoustic models may be associated with individual speakers 102A-102C or with speakers 102A-102C of a certain gender or age, or may be general-use acoustic models for use with many speakers 102A-102C. The modeling computing device 300 may, upon receiving speech from the local computing device 200, select an acoustic model from the remote data store 350, use the selected acoustic model to generate a transcription (or other speech recognition results) of the speech; update the selected acoustic model based on the transcription (or other speech recognition results), and store the updated model in the remote data store 350.

It will be recognized that many of the devices described above are optional and that embodiments of the environment 100 may or may not combine devices. Furthermore, devices need not be distinct or discrete. Devices may also be reorganized in the environment 100. For example, the modeling computing device 300 may be represented in a single physical server or, alternatively, may be split into multiple physical servers. The entire modeling service may be represented by the local computing device 200 as well. It should also be noted that one modeling computing device 300 may be in communication with one or multiple local computing devices 200 to implement the modeling service.

Additionally, it should be noted that in some embodiments, the modeling service may be executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
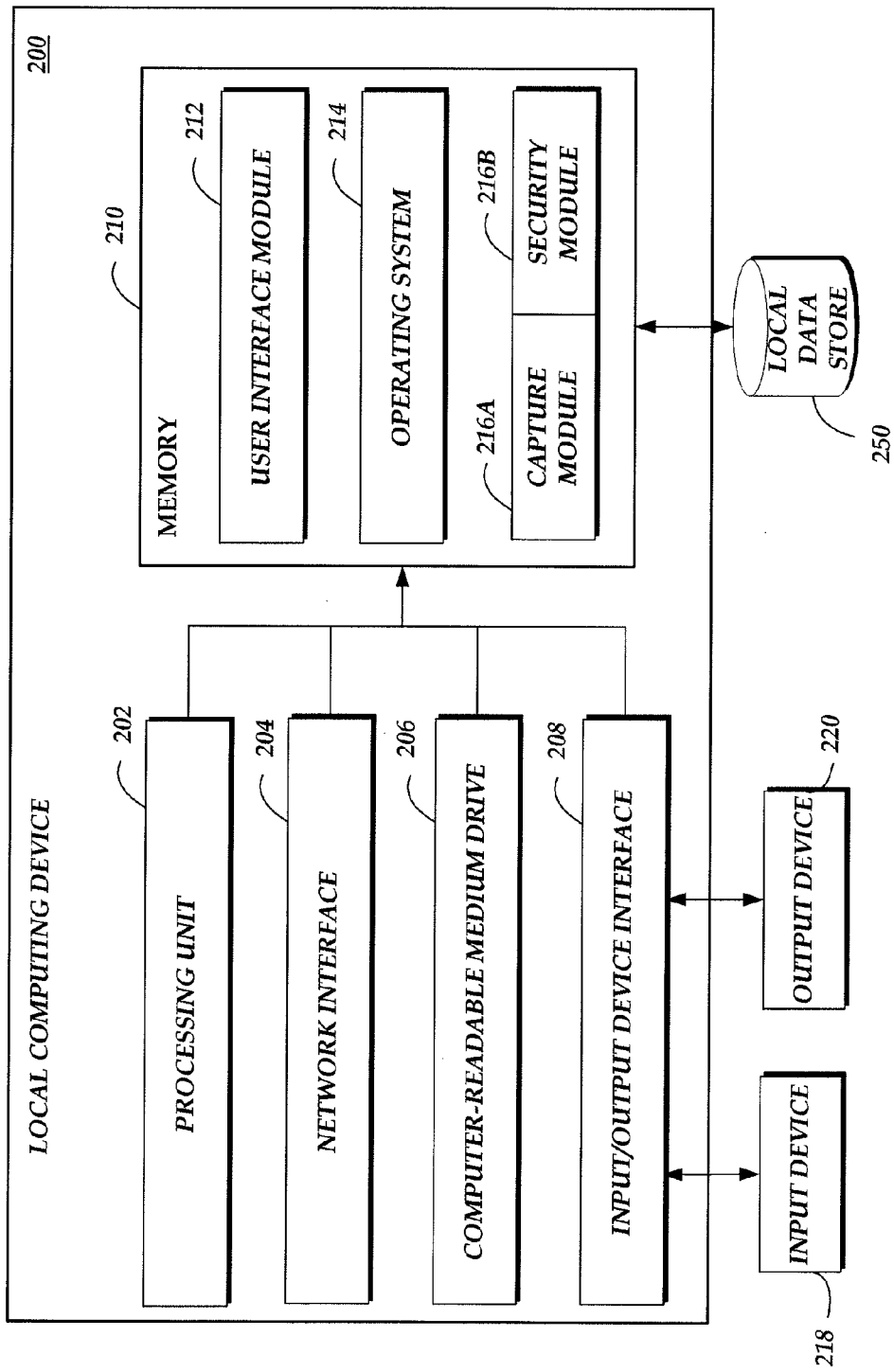
FIG. 2 is a schematic diagram of an illustrative local computing device.
Figure 3:
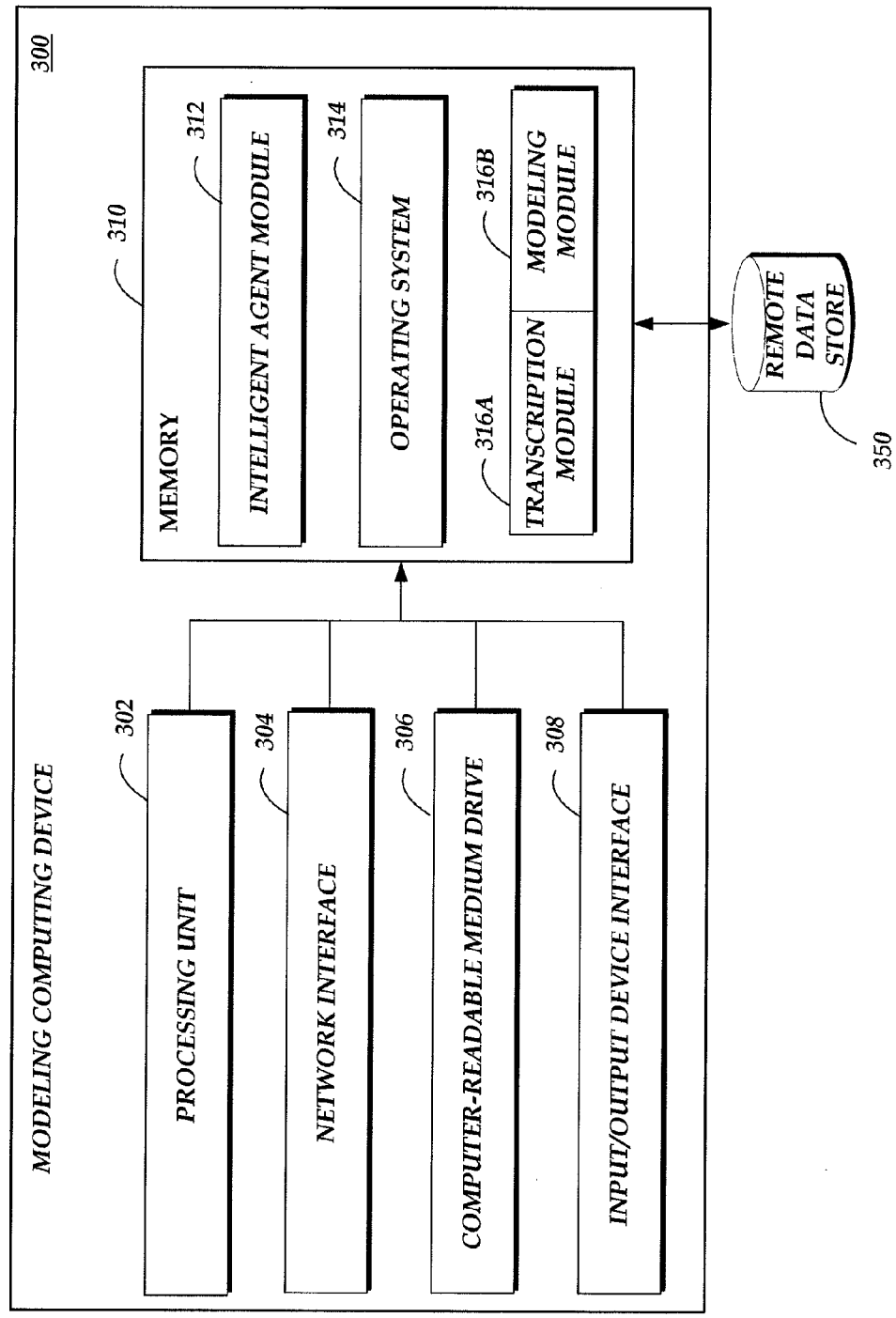
FIG. 3 is a schematic diagram of an illustrative modeling computing device.

FIG. 2 is a schematic diagram of the local computing device 200 shown in FIG. 1. The local computing device 200 includes an arrangement of computer hardware and software components that may be used to implement the modeling service. FIG. 3 depicts a general architecture of the modeling computing device 300 shown in FIG. 1. Those skilled in the art will recognize that the local computing device 200 and the modeling computing device 300 may include more (or fewer components) than those shown in FIG. 2 and FIG. 3, respectively. It is not necessary, however, that all of these components be shown in order to provide an enabling disclosure.

The local computing device 200 includes a processing unit 202, a network interface 204, a non-transitory computer-readable medium drive 206, and an input/output device interface 208, all of which may communicate with one another by way of a communication bus. The network interface 204 may provide the local computing device 200 with connectivity to one or more networks or computing systems. The processing unit 202 may thus receive information and instructions from other computing systems (such as the local computing device 200) or services via the network 110. The processing unit 202 may also communicate to and from memory 210. The input/output device interface 208 may accept input from the input device 218. In one embodiment, the input device 218 includes one or more microphones or receivers for capturing speech. In some embodiments, the input device 218 includes a directional microphone, which may be implemented as a microphone array. Other hardware or software input may be provided as well through the input device 218. The input/output device interface 208 may also output audio data to an output device 220 such as speakers or headphones (not shown), or may output visual data to an output device 220 comprising a display screen (also not shown).

The memory 210 contains computer program instructions that the processing unit 202 executes in order to implement one or more embodiments of the modeling service. The memory 210 generally includes RAM, ROM, and/or other persistent or non-transitory computer-readable storage media. The memory 210 may store an operating system 214 that provides computer program instructions for use by the processing unit 202 in the general administration and operation of the local computing device 200. The memory 210 may further include other information for implementing aspects of the modeling service. In addition, memory 210 may include or communicate with the local data store 250. The local data store 250 may include one or more acoustic models as discussed above, and may also store information about a speaker's prosody or information used to select a model for a speaker.

The memory 210 may also include a capture module 216A that may be executed by the processing unit 202. In one embodiment, the capture module 216A is used to implement aspects of the modeling service pertaining to capturing speech. For example, the capture module 216A may capture a sound and apply spectral analysis or other known techniques for analyzing sounds to determine if the sound contains speech. Sounds that do not include speech may be discarded, while sounds that do contain speech may be considered for further processing by the modeling service (e.g., for transcription and/or for updating an acoustic model). For example, waveform analysis may be performed on the speech. The captured speech's waveform may be analyzed to determine if certain spectral bands are present (as the absence of certain spectral bands may indicate a spurious source of speech, such as a character speaking on a television show); to determine how closely the speech corresponds to an existing acoustic model; to determine a volume or intensity of background noise; and to determine other aspects of the waveform. Other techniques to identify acceptable speech in an audio signal may be used as well. For example, a classifier may be used to classify the audio signal into speech, background noise, music, or audio from a television. The classifier may implemented by any techniques known by one of skill in the art, including linear classifiers, support vector machines, and decision trees.

Additionally, in some embodiments, the local computing device 200 may be configured to accept speech in the form of voice commands to perform various functions as might be performed by the example computing devices discussed above. For example, the local computing device 200 might be configured to convey digital media, such as songs, television programs, and the like. A speaker may speak a voice command requesting that the local computing device 200 play the song, television program, etc. These voice commands may be deemed "directed" speech. It should be appreciated, however, that the local computing device 200 may also capture signals that include speech that is not directed to the local computing device 200.

The capture module 216A does not necessarily capture all speech at all times. In some embodiments, speech is only captured by the capture module 216A when the local computing device 200 is in a monitoring state. In one embodiment, the local computing device 200 is substantially always in a monitoring state. In another embodiment, the local computing device 200 is in the monitoring state for a period of time exceeding ten minutes. In yet another embodiment, the local computing device 200 is in the monitoring state during a predetermined time interval, which may be set automatically or manually. For example, the user interface module 212 may provide user interfaces to allow a speaker to designate a time interval during which the local computing device 200 should operate in the monitoring state.

In still further embodiments, the local computing device 200 enters the monitoring state in response to a stimulus. Several types of stimuli may be used. In one embodiment, a stimulus includes speaker input. For example, a speaker may interact with an input device 220 (such as a hardware or software button, control, selectable element, etc.,) to provide the stimulus to the local computing device 200. In another example, the capture module 216A may, in conjunction with the input device 218, be implemented to detect an external stimulus. For example, the local computing device 200 may enter a monitoring state in response to a stimulus that includes the sound of footsteps in the listening zone 150 captured by an input device 218 that includes a microphone, or the sound of a "wake word" (which may be designated through a user interface provided by the user interface module 212) or voice query or command spoken directed to the input device 218. In another example, the local computing device 200 may enter a monitoring state in response to a stimulus that includes a visual detection of a speaker made by an input device 218 that may include a still or video camera. For example, a speaker may direct speech to the local computing device 200 by facing the still or video camera provided in an input device 218 and speaking into a microphone also provided by an input device 218. Still other stimuli may be detected.

The capture module 216A may also be operative to identify a speaker of speech. For example, the capture module 216A may access information about one or more speakers stored in the local data store 250 upon receiving speech. The information about the speakers may be used to identify the speaker. In another example, the capture module 216A may transcribe the speech in part using multiple acoustic models stored in the local data store 250. Each of these acoustic models may be associated with a particular speaker or characteristic common to one or more speakers. The acoustic model that provides the highest confidence level for transcribing the speech may be assigned to the speaker or characteristic. In yet another example, if multiple speakers are present, speaker recognition techniques known in the art may be used to identify a speaker of each speech.

Additionally, image analysis may be used to identify a speaker. The input device 218 may accordingly include a still or video camera. For example, an image of a speaker's face may be obtained and used to identify the speaker by comparing the obtained image to a known image of the speaker's face. More information on techniques for identifying a speaker based on an audible speech or visual identification is provided in U.S. Pat. Pub. No. 2003/0144844, entitled "AUTOMATIC SPEECH RECOGNITION SYSTEM AND METHOD," filed Jan. 30, 2002, the disclosure of which is hereby incorporated by reference in its entirety.

The memory 210 may further include a security module 216B. The security module 216B may generally be employed to secure a captured speech for transmission over the network 110 to a modeling computing device 300. In one embodiment, the captured speech is secured by encrypting the speech. In another embodiment, the captured speech is decomposed into one or more sound units, and each sound unit may be transmitted separately over the network 110. In still another embodiment, the security module 216B may request permission (e.g., through a user interface generated by user interface module 212) to transmit speech over the network 110. The security module 216B may also be employed to secure information regarding the speaker of speech or information about confidence levels of the speech before transmitting that information over the network 110 to a modeling computing device 300. In some embodiments, features or statistics derived from the features may be sent instead of the speech. Other methods for securing network communications are well-known in the art and need not be discussed in further detail here.

FIG. 3 is a schematic diagram of the modeling computing device 300 shown in FIG. 1. The modeling computing device 300 includes an arrangement of computer hardware and software components that may be used to implement the modeling service. FIG. 2 depicts a general architecture of the modeling computing device 300 shown in FIG. 1. Those skilled in the art will recognize that the modeling computing device 300 may include more (or fewer components) than those shown in FIG. 3. It is not necessary, however, that all of these components be shown in order to provide an enabling disclosure.

As with the local computing device 200, the modeling computing device 300 may include conventional components such as a processing unit 302, a network interface 304, a non-transitory computer-readable medium drive 306, and input/output device interface 308, all of which may communicate with one another by way of a communication bus. The modeling computing device may also include a memory 310, which may store an operating system 314. These components and modules generally operate similarly to their counterparts described above with respect to FIG. 2. The network interface 304 may be used to receive speech, indications of speakers, and indications of confidence levels over the network 110 from one or more local computing devices 200.

The memory 310 may also include an intelligent agent module 312. Generally described, intelligent agents include an arrangement of software and/or hardware that can respond to natural language queries or commands to retrieve information, perform tasks, etc. For example, the intelligent agent module 312 may identify a query or command in the speech recognition results generated by the transcription module 316A. The intelligent agent module 312 may respond to the query or command and relay the results to the local computing device 200 for presentation thereon. U.S. patent application Ser. No. 12/987,982, titled "Intelligent Automated Assistant," which was filed on Jan. 10, 2011 and published as U.S. Patent Pub. No. 2012/0016678 on Jan. 19, 2012, previously incorporated by reference above, provides more information about the operation of intelligent agents.

The memory 310 may further include a transcription module 316A. The transcription module 316A may, based on the speech or portion of the speech received from a local computing device 200, generate speech recognition results (such as a textual transcription) using an acoustic model stored in the remote data store 350, and align one or features of the speech to one or more text subunits in the transcription. In one embodiment, the transcription module 316A uses a Hidden Markov Model (HMM) and a dynamic programming algorithm to transcribe the text. The transcription module 316A may also be operative to decrypt or reassemble the speech or units thereof if encrypted or decomposed by the local computing device 200.

The memory 310 may still further include a modeling module 316B. The modeling module 316B may be used to update the acoustic model used to transcribe the speech into text by the transcription module 316A. An example will be illustrative.

First, an existing acoustic model may be obtained using a set of training data. The training data may corresponding to multiple speakers and include audio data and a transcription of the audio data, which may be from a human transcription or from the transcription module. In some embodiments, a particular phoneme (or other sound unit comprising one or more frames, such as a triphone) may be represented in the acoustic model by one or more hidden Markov model (HMM) states (which may be tied or untied), and each of the HMM states may be represented as a Gaussian mixture model (GMM). A GMM may include a linear combination of Gaussian distributions, each with a particular weight, mean, and variance (which may be, for example, a full variance or a diagonal variance). The GMM for an HMI state may be trained using features aligned to that HMM state (for example, using a Viterbi alignment or the output of the transcription module 316A). Once the features are aligned to an HMM state, the GMM may be estimated using techniques such as k-means, vector quantization, and the expectation maximization algorithm. The GMM trained in this way represents an approximate probability distribution for features associated with the HMM state.

After receiving audio data corresponding to a particular speaker, the acoustic model may be modified to better match the speech of that speaker. For example, one of the Gaussian distributions Gl (of a GMM corresponding to an HMI state of a phoneme) may have a mean m. Speech may include a spoken phoneme that corresponds to the Gaussian distribution Gl. However, the features of the speech corresponding to Gl may have a mean m+p instead of a mean m. Because the features are otherwise a close match to the phoneme, the features may be recognized as containing the phoneme by the transcription module 316A. However, the modeling module 316B may then update the acoustic model to generate an updated acoustic model. In some embodiments, the mean of Gl may be moved to be closer to the corresponding features of the speech. For example, the mean of Gl may be modified to have a value between m and m+p.

The modeling module 316B may also receive an indication of the confidence level of the speech from the local computing device 200. The confidence level may be used to weight the updating of the acoustic model. Transcriptions (or portions thereof) with higher confidence values may have relatively higher weights. Transcriptions (or portions thereof) with lower confidence values may have relatively lower weights, such that the acoustic model is only slightly updated (e.g., the mean of a Gaussian distribution is shifted only slightly). As discussed above, the confidence level may be determined by a variety of factors, including but not limited to the volume and duration of the speech; the level of background noise of the speech; whether the speech is a directed speech; probability scores produced by the transcription module; and other factors. In some embodiments, transcriptions with a sufficiently low confidence value may be discarded so that the acoustic model is not updated at all. It will be appreciated that the operations of the modeling module 316B may be used generally with other types of speech recognition results as well.

The modeling module 316B may further update the acoustic model when it receives new speech or new batches of speech to transcribe. Older data used to update the acoustic model may be discarded in some embodiments, such that only adjustments prompted by more recent speech recognition results are used to generate the updated acoustic model. For example, a window may be used such that only the two most recent batches of speech are used in updating the acoustic model for recognizing subsequent speech. Thus, after the first, second, and third batches of speech have been received, the first batch's contribution to the updated model may be discarded. In some embodiments, a moving average may be used instead of a window, for example, with an exponentially decaying weight. With a moving average, the influence of older batches may gradually decay over time.

As discussed above, speech may be provided in batches to the acoustic modeling service for updating the acoustic model. Batches of speech may include only one captured utterance, or may include tens, hundreds, or thousands of utterances. In some embodiments, the acoustic model is updated on a batch-by-batch basis. In a manner similar to the above example, the acoustic modeling service may capture a first batch of speech and a second batch of speech. These batches of speech may be used to update one or more Gaussian distributions of an acoustic model. A third batch of speech may then be captured. The contributions of the first batch of speech to the acoustic model may be discarded, such that only the second batch of speech and third batch of speech contribute to the updated acoustic model. In this way, the acoustic model may be continually updated over time in a batched process.

While adjustments made to the means and variances of Gaussian distributions in a Gaussian mixture model representing a phoneme (or other sound unit) have been discussed above for illustrative purposes, other aspects of the acoustic model may be updated as well. For example, the variances and the weights of the Gaussian distributions of the Gaussian mixture model may be updated. Moreover, the feature vectors themselves may be updated by applying a linear transformation to the n-dimensional vectors in the feature space based on speech recognition results. These updates may be weighted based on a confidence level of the results. Additionally, in some embodiments, only updates generated from relatively recently transcribed speech are used to update the model.

Furthermore, while a simple example technique for updating an acoustic model was described above for illustrative purposes, the modeling module 316B may also be configured to employ other techniques to update the acoustic model and/or adapt the acoustic model specifically to a speaker if one has been identified. For example, to update the feature vectors of an acoustic model, vocal tract length normalization (VTLN); linear transformations such as feature space maximum likelihood linear regression (fMLLR); discriminative techniques such as feature-space maximum mutual information (fMMI) or feature-space minimum phone error (fMPE); or other techniques known in the art may be used. To update a GMM in the acoustic model, maximal a posteriori (MAP); maximum likelihood linear regression (MLLR); discriminative techniques such as maximum mutual information (MMI), boosted MMI (bMMI), minimum classification error (MCE), minimum phone error (MPE); or other techniques known in the art may be used. These techniques may incorporate the weights determined by confidence values, and may also in some embodiments only account for updates based on relatively recently transcribed speech.

Those skilled in the art will recognize that the local computing device 200 may be further configured to transcribe speech and update the acoustic model. Accordingly, the local computing device 200 may include a transcription module 316A and a modeling module 316B. The local computing device may also be configured to operate as an intelligent agent and may include an intelligent agent model 312. Likewise, the modeling computing device 300 may be further configured to capture speech (e.g., through a microphone or receiver in communication with the modeling computing device 300), identify a speaker of the speech, and secure speech. Accordingly, the modeling computing device 300 may include a capture module 216A and a security module 216B. More generally, the various tasks carried out by the modeling service may be allocated as desired between the local computing device 200 and the modeling computing device 300. Hardware and software components as described above may be provided in the local computing device 200 and/or the modeling computing device 300 to provide each device with the desired functionality.

Figure 4:
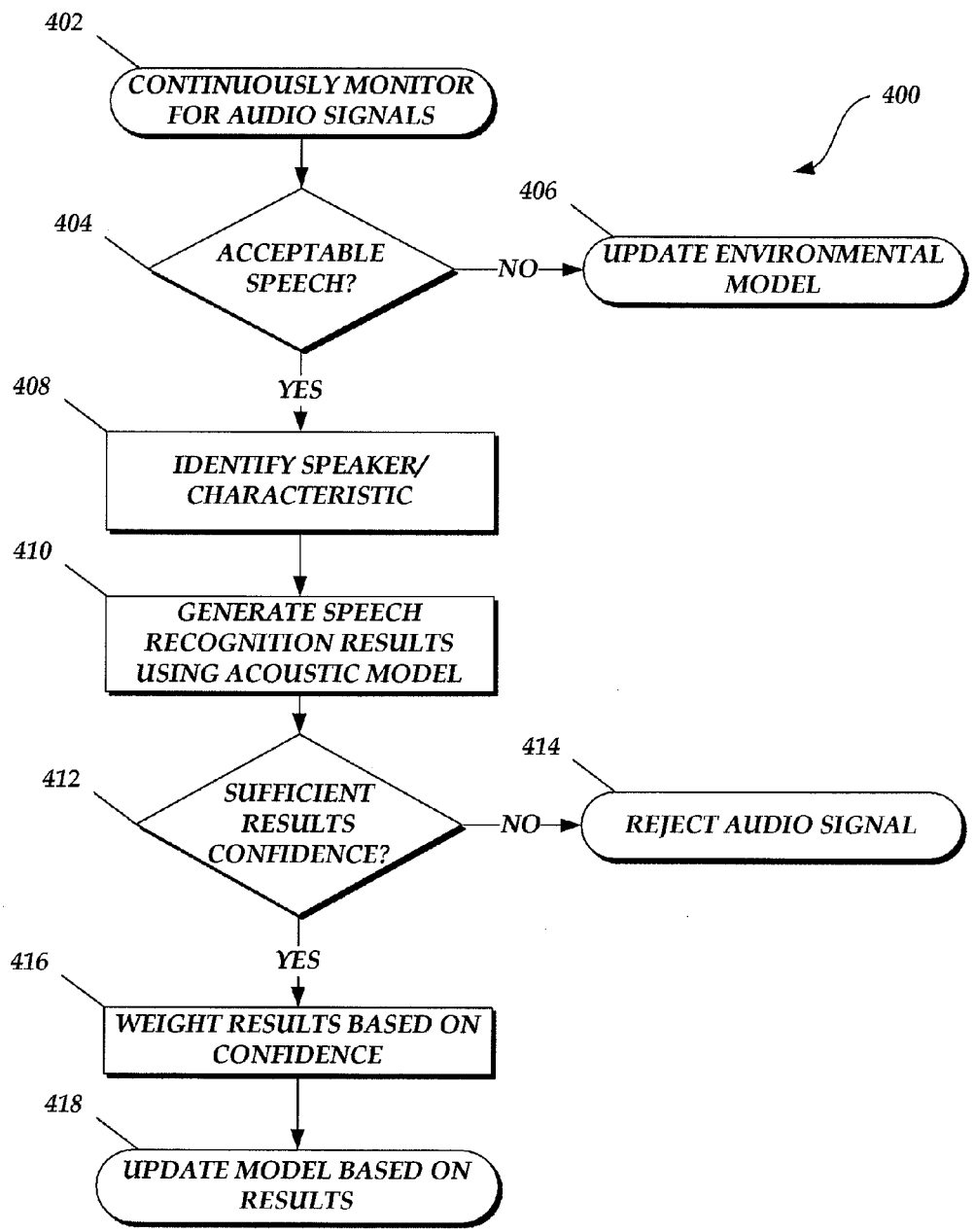
FIG. 4 is a flow diagram depicting an illustrative routine for unsupervised acoustic model training.

FIG. 4 depicts an illustrative routine 400 for unsupervised acoustic modeling. In block 402, a sound may be captured as a computing device (such as the local computing device) continuously monitors for audio signals. A microphone or receiver in communication with a local computing device 200 may receive or capture an audio signal in the listening zone 150. As discussed above, in some embodiments, the local computing device 200 only captures audio signals when the local computing device 200 is in a monitoring state. In other embodiments, the local computing device 200 may be configured in an "always-on" state so that audio signals in the listening zone 150 are always captured. In still further embodiments, the local computing device 200 may be configured to monitor for speech and capture audio signals for intervals which may be greater than ten minutes, an hour, a day, or any other desired time interval.

In some embodiments, a microphone or receiver (or array of microphones or receivers) may operate continuously for certain time periods, such as greater than ten minutes, an hour, a day, or any other desired time interval. The signal output by the microphone or receiver may be processed, for example by using streaming techniques, to identify portions of the signal that contain sounds (as opposed to silence or near silence). Techniques such as endpointing may be used to extract sounds from the streaming signal, and models of silence (or near silence) and models for sounds may be used in the endpointing. The signal output by the microphone may be used to create models for silence and sounds. Endpointed signals comprising the sounds may be further processed by the local computing device. Any techniques known to one of skill in the art may be used to endpoint a streaming signal or to separate sounds from silence (or near silence).

In block 404, the audio signal may be examined to determine if the audio signal contains acceptable speech to be used by the modeling service. For example, the audio signal may not contain speech or the speech may contain too little information to be of use in updating the acoustic model if its duration is too short. For example, if the signal-to-noise ratio of the speech is too low, it may be difficult to generate speech recognition results from the speech, and the speech may not be useful as a source of data for the modeling service. Other techniques to identify acceptable speech in an audio signal may be used as well. For example, a classifier may be used to classify the audio signal into speech, background noise, music, or audio from a television, among other possible classifications. The classifier may implemented by any techniques known by one of skill in the art, including linear classifiers, support vector machines, and decision trees.

In some embodiments, either the local computing device 200 or the modeling computing device 300 (or both) may implement the functionality described in block 404. The local computing device 200 may determine if the audio signal contains acceptable speech using techniques that require fewer computational resources and/or may be over inclusive in determining whether speech is acceptable. In some embodiments, the local computing device 200 may only reject speech as unacceptable when the speech is clearly unacceptable (e.g., the speech is of too short a duration or at too low a volume to be useful). The modeling computing device 300 may then determine if the audio signal contains acceptable speech using techniques that require greater computational resources and/or may apply stricter requirements in determining whether speech is acceptable. In some embodiments, the modeling computing device 300 may provide feedback to the local computing device 200. For example, the local computing device 200 may make an initial determination that a signal contains acceptable speech, and the server computing device 300 may perform additional processing and may agree or disagree. The server computing device 300 may send information related to the processing back to the local computing device 200 so that the local computing device 200 may improve its determination of whether speech is acceptable, such as by updating models for speech and for sounds that are not speech.

If the audio signal does not include acceptable speech, the audio signal may be used to update an environmental model in block 406. Generally described, an environmental model may represent a statistical distribution of sounds in the environment (e.g., the listening zone 150) of a computing device. In one embodiment, the environmental model is used to represent sound units or phonemes for "silence" or "noise" in the acoustic model. Techniques known in the art, such as cepstral mean normalization, may be used to update the environmental model. In some embodiments, if the audio signal does not include acceptable speech, the audio signal is simply discarded, without necessarily updating an environmental model.

In block 408, a speaker of the speech may be identified, or the speaker may be identified as having a particular characteristic. As discussed above, speaker recognition techniques known to one of skill in the art may be used to identify a speaker of speech. Additionally, in some embodiments, part or all of the speech is transcribed using different acoustic models, each acoustic model being associated with a specific speaker or characteristic of one or more speakers. The speaker (or characteristic) whose acoustic model produced the highest confidence value for the speech recognition results may be identified as likely producing the best results. As discussed above, a characteristic may include gender, or belonging to or being associated with a household or other common environment in the listening zone 150. More than one speaker recognition technique may be used to identify a speaker or characteristic.

In block 410, speech recognition results may be generated from the speech (e.g., the speech may be transcribed into text using the acoustic model). The output of block 410 may be a single transcription or it may contain multiple alternative transcriptions in the form of an n-best list or a lattice, or may include other types of speech recognition results. Each phoneme and/or word of the lattice may be associated with a probability. One or more frames of the speech may be aligned with a sound unit or word of the text In block 412, a confidence value of the speech recognition results (e.g., a transcription) may be generated and analyzed. As discussed above, the confidence value of the speech recognition results may depend on how well the acoustic model fits the speech, a level of background noise, and other factors. The confidence value of the speech recognition results may also depend on whether the speech was directed to a computing device, such as the local computing device 200 (e.g., whether the speech includes a voice command or query, which may be processed by an intelligent agent), or was not directed to a computing device (e.g., as conversation among speakers in the listening zone 150).

If the confidence value of the speech recognition results (e.g., the transcription results) does not satisfy the threshold, the speech recognition results may be rejected or discarded in block 414. In some embodiments, if the confidence value of the speech recognition results does not satisfy the threshold, the signal from which the speech recognition results were generated may be used to update an environmental model as described above in block 406. In some embodiments, the speech recognition results may be discarded even if the speech recognition results satisfy the confidence threshold. For example, the models for some sound units may not be updated if sufficient data about those sound units was previously made available to the modeling service (e.g., the modeling service may have previously received numerous signals containing information about a sound unit).

If the confidence value of the speech recognition results does satisfy the threshold, a weight for the speech recognition results may be generated in block 416. As discussed above, this weight may specify how far the acoustic model is shifted or updated to match the speech. Relatively high confidence values may be associated with relatively high weights, and relatively low confidence values may be associated with relatively low weights.

Finally, in block 418, the acoustic model may be updated based at least in part on the speech recognition results generated in block 410. As discussed above, several techniques may be used adjust various aspects of the acoustic model. To make feature space updates, vocal tract length normalization (VTLN) or a linear transformation such as feature space maximum likelihood linear regression (fMILLR) may be applied to the feature vectors. Discriminative techniques, such as feature-space maximum mutual information (fMMI) and feature-space minimum phone error (fMPE), may also be used to make feature space updates. To make Gaussian mixture model updates, maximal a posteriori (MAP) or maximum likelihood linear regression (MLLR) may be employed, or the means, variances, or weights of the Gaussian distributions may be updated. Discriminative techniques, such as maximum mutual information (MMI), boosted MMI (bMMI), minimum classification error (MCE), and minimum phone error (MPE), may also be used to make Gaussian mixture model updates.

Figure 5A:
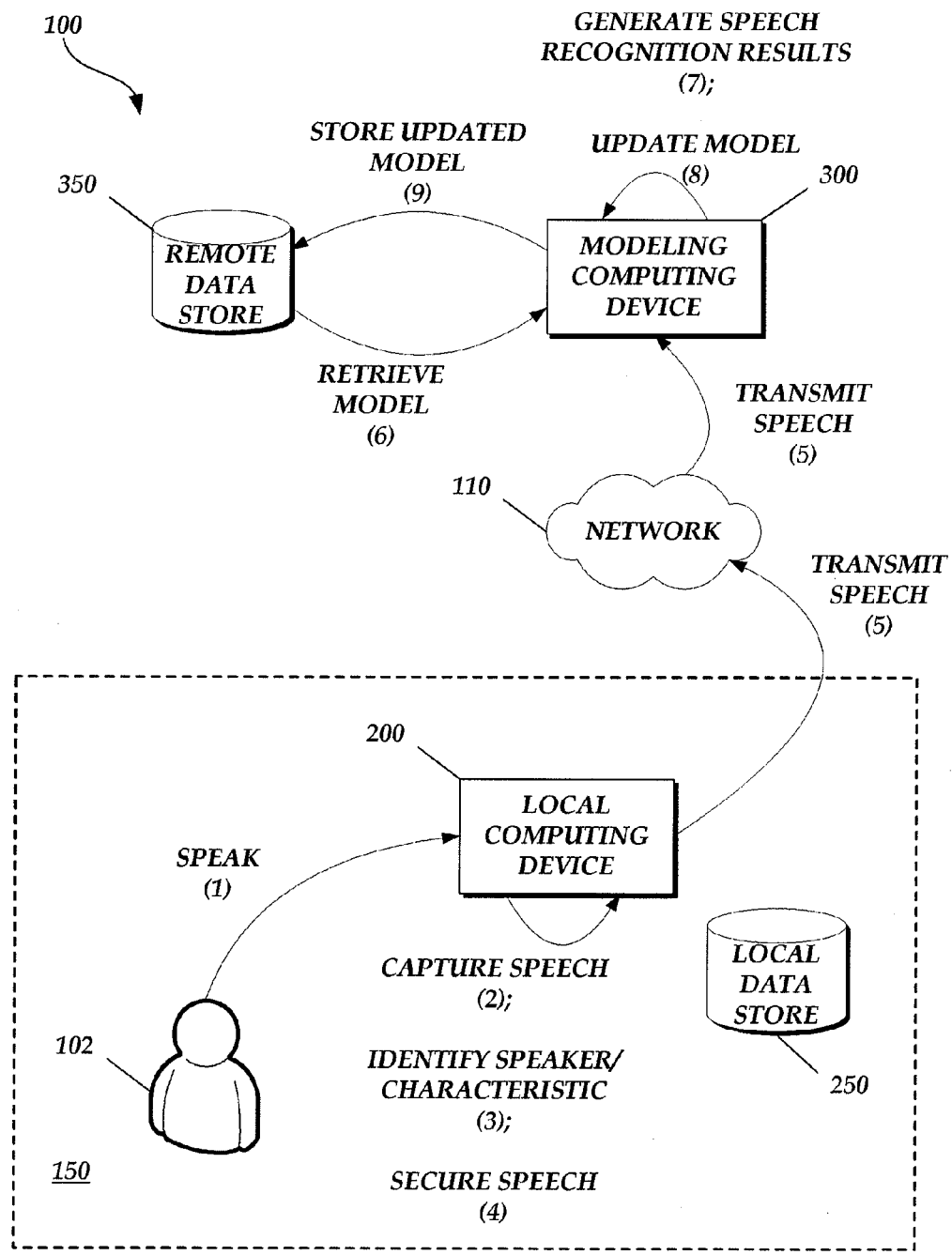
FIG. 5A and FIG. 5B are state diagrams depicting illustrative operations of the unsupervised acoustic modeling service.
Figure 5B:
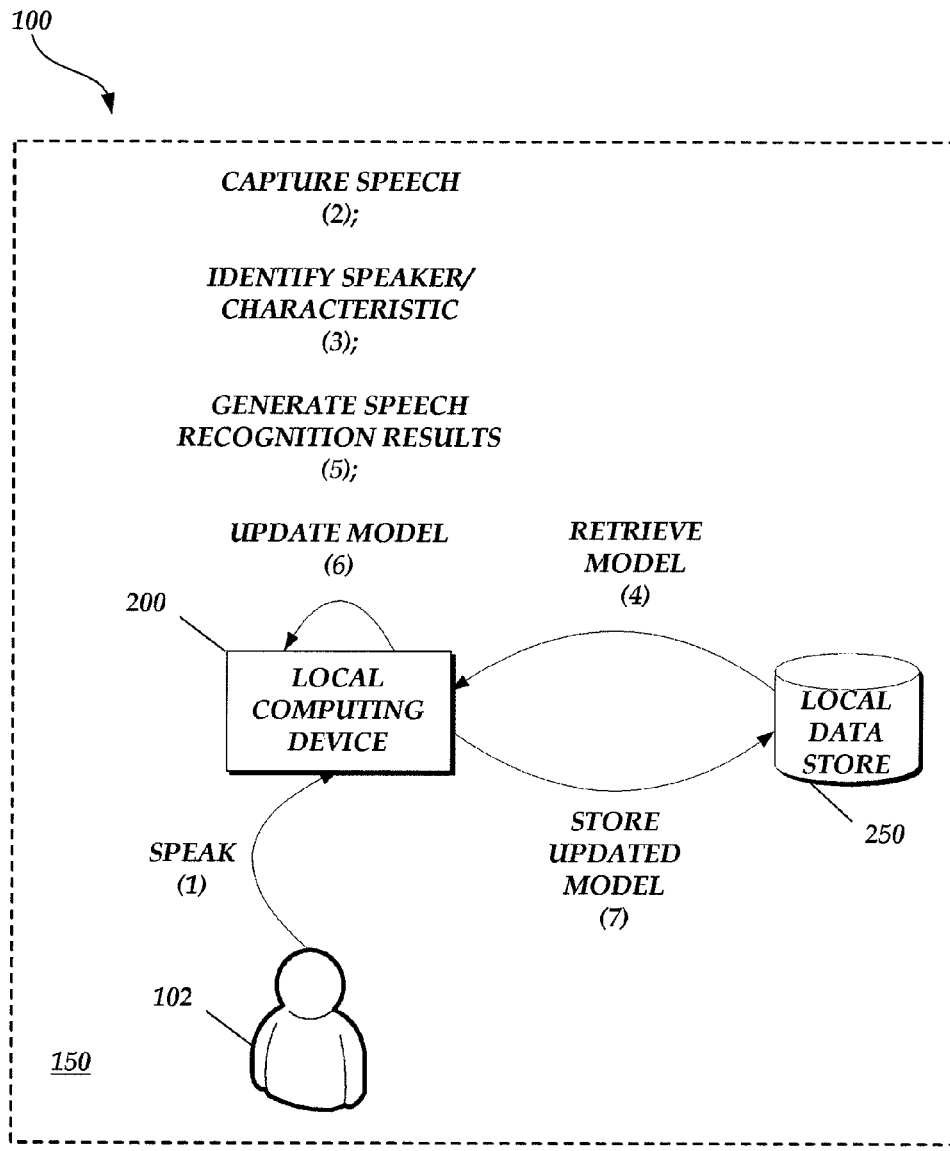

FIG. 5A and FIG. 5B depict example operations of the modeling service in the network environment 100. While two example operations are depicted herein, it will be appreciated that other operations of the modeling service are possible.

Turning to FIG. 5A, a speaker 102 may speak speech (1) in a listening zone 150 of the local computing device 200. The local computing device 200 may capture a signal representing a sound, which may include speech (2) and, if the speech is deemed acceptable, the local computing device 200 may optionally identify the speaker or one or more characteristics of the speaker (3), substantially as discussed above with respect to blocks 402, 404, and 408 in FIG. 4. Information may optionally be retrieved from the local data store 250 to facilitate identifying a speaker and/or one or more characteristics of the speaker. The speech may be secured (4) and transmitted (5) over the network 110 to the modeling computing device. An indication of the identified speaker or characteristic may be transmitted as well. As discussed above, speech may be secured by encrypting it, by decomposing it into one or more blocks of frames, or by other information security techniques. As further discussed above, speech may be transmitted from the local computing device 200 to the modeling computing device 300 on an utterance-by-utterance basis or in batches. Upon receiving the speech, the modeling computing device 300 may retrieve an acoustic model (6) from the remote data store 350. If the local computing device 200 transmitted an identification of the speaker or a one or more characteristics of the speaker, the retrieved model may be an acoustic model associated with the speaker, or may be appropriate for a speaker having the one or more characteristics. The speech may decrypted or reassembled if necessary by the modeling computing device 300, and speech recognition results may be generated therefrom using the acoustic model (7), substantially as described above with respect to block 410 in FIG. 4. The recognition results may then be used to update the model (8) as described above with respect to blocks 416 and 418 in FIG. 4. The updated model may then be stored (9) in the remote data store 350 for future use and retrieval.

Turning to FIG. 5B, a speaker 102 may speak speech (1) in a listening zone 150 of the local computing device 200. The local computing device 200 may capture a signal representing a sound, which may include speech (2) and, if the speech is deemed acceptable, the local computing device 200 may optionally speaker and/or one or more characteristics of the speaker (3), substantially as discussed above with respect to blocks 402, 404, and 408 in FIG. 4. Upon receiving the speech, the modeling computing device 200 may retrieve an acoustic model (4) from the local data store 250. If a speaker and/or one or more characteristics of the speaker are identified, the retrieved model may be an acoustic model associated with the speaker, or may be appropriate for the characteristic. Speech recognition results may be generated using the acoustic model (5), substantially as described above with respect to block 410 in FIG. 4. The speech recognition results may be used to update the acoustic model (6), e.g., by weighting the speech recognition results based on a confidence value and modifying one or more feature vector transformations or Gaussian mixture models of those feature vectors based on the speech recognition results, substantially as described above with respect to blocks 416 and 418 in FIG. 4. The updated model may then be stored (7) in the local data store 250 for future use and retrieval.

Criteria may be provided to select which of the operations described above is followed for speech. In some embodiments, a speaker 102 may set a preference as to which operation is followed. For example, the operation in FIG. 5A may provide for faster speech recognition and modeling than the operation in FIG. 5B, as the modeling computing device 300 may have relatively more computing power than the local computing device 200. In some embodiments, the operation depicted in FIG. 5B is selected if the local computing device 200 has no connection to the network 110, or if permission has not been given to the local computing device 200 to transmit speech over the network 110. Additionally, in one embodiment, the local computing device 200 computes statistics (e.g., the deltas and energy bands described above) that may be used to update the acoustic model and may transmit these statistics over the network 110, which may advantageously ensure the privacy of the contents of the speech. In another embodiment, the local computing device 200 identifies only a characteristic of the speaker instead of identifying a particular speaker.

Additionally, with respect to FIG. 5A and FIG. 5B, it will be recognized that similar operations may be performed to update an environmental model. For example, the local computing device 200 may capture an audio signal that does not include speech. The local computing device 200 may determine that the audio signal does not include speech, and transmit the audio signal to the modeling computing device 300 so that the modeling computing device 300 can update the environmental model for storage and future retrieval in the remote data store 350. Alternately, the local computing device may update the environmental model locally, and store the updated environmental model in the local data store 250 for future retrieval and use. As discussed above, the environmental model in some embodiments corresponds to a "noise" or "silence" phoneme or other sound unit.

Many of the operations of the present disclosure are sufficiently mathematically or technically complex that one or more computing devices may be necessary to carry them out. For example, generating speech recognition results from audio signals, computing linear transforms and new coefficients, applying classifier algorithms, and identifying speakers or characteristics of speakers are all tasks that may effectively require resort to a computing device owing to the volume and complexity of the calculations involved.

Depending on the embodiment, certain acts, events, or functions of any of the routines or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for unsupervised acoustic modeling, the system comprising:

an electronic data store configured to store a plurality of acoustic models;

a remote computing device in communication with the electronic data store; and a local computing device in communication with the remote computing device over a network;

wherein the system is configured to:

obtain a first signal from a microphone, wherein the first signal comprises first speech;

generate first speech recognition results using the first signal and an acoustic model, wherein the first speech recognition results comprise a first textual transcription of the first speech in the first signal;

subsequent to generating the first speech recognition results:

determine a first confidence value indicative of a confidence that the first speech recognition results generated using the acoustic model comprise an accurate transcription of the first speech, generate a first updated acoustic model based at least in part on the first confidence value;

generate second speech recognition results using a second signal and the first updated acoustic model, wherein the second speech recognition results comprise a second textual transcription of the second speech in the second signal; and subsequent to generating the second speech recognition results:

determine a second confidence value indicative of a confidence that the second speech recognition results generated using the first updated acoustic model comprise an accurate transcription of the second speech;

determine that the first speech recognition results were generated outside a window; and generate a second updated acoustic model based at least in part on the second confidence value.

2. A computer-implemented method comprising:

under control of a computing device comprising one or more computer processors implemented in hardware and configured to execute specific computer-executable instructions, receiving a first signal;

generating first speech recognition results using the first signal and an acoustic model, wherein the first speech recognition results comprise a textual transcription of first speech; and subsequent to generating the first speech recognition results:

determining a first confidence value associated with the first speech recognition results;

generating a first updated acoustic model based on the first confidence value associated with the first speech recognition results;

receiving a second signal;

generating second speech recognition results using the second signal and the first updated acoustic model, wherein the second speech recognition results comprise a textual transcription of second speech;

determining a second confidence value associated with the second speech recognition results;

determining that the first speech recognition results were generated outside a window; and generating a second updated acoustic model based at least in part on the second confidence value.

3. The system of claim 1, wherein the system is further configured to monitor microphone output for a period of time exceeding ten minutes.

4. The system of claim 3, wherein the first speech is not directed to the local computing device.

5. The system of claim 1, wherein the system is configured to determine that the first signal comprises the first speech using based at least in part on a classification algorithm.

6. The system of claim 1:

wherein the acoustic model comprises a Gaussian mixture model; and wherein a Gaussian distribution is included in the Gaussian mixture model.

7. A computer-implemented method comprising:

under control of a computing device comprising one or more computer processors implemented in hardware and configured to execute specific computer-executable instructions, receiving a first signal;

generating first speech recognition results from the first signal using and an acoustic model, wherein the first speech recognition results comprise a textual transcription of first speech; and subsequent to generating the first speech recognition results:

determining a first confidence value associated with the first speech recognition results;

generating a first updated acoustic model based on the first confidence value associated with the first speech recognition results;

receiving a second signal;

generating second speech recognition results from the second signal using and the first updated acoustic model, wherein the second speech recognition results comprise a textual transcription of second speech;

determining a second confidence value associated with the second speech recognition results;

determining that the first speech recognition results were generated outside a window; and generating a second updated acoustic model based at least in part on the second confidence value.

8. The computer-implemented method of claim 7, further comprising determining that the first signal comprises the first speech by:

obtaining an endpointed signal, wherein the endpointed signal comprises one or more sounds and wherein the endpointed signal corresponds to a portion of the first signal; and using a classifier to determine that the one or more sounds comprise the speech.

9. The computer-implemented method of claim 8, wherein receiving a first signal comprises:

monitoring a signal output by a microphone; and obtaining the first signal, wherein the first signal comprises one or more sounds;

wherein the first signal corresponds to a portion of the signal output by the microphone.

10. The computer-implemented method of claim 8 further comprising:

identifying a speaker of the first speech; and transmitting information about the speaker to a server computing device.

11. The computer-implemented method of claim 8 further comprising:

identifying a characteristic of a speaker of the first speech; and transmitting information about the characteristic to a server computing device.

12. The computer-implemented method of claim 11, wherein the characteristic is a gender of the speaker.

13. The computer-implemented method of claim 11, wherein the characteristic is information about a household of the speaker.

14. The computer-implemented method of claim 9, wherein monitoring a signal output by a microphone comprises monitoring a signal output by a microphone for a time period exceeding ten minutes.

15. The computer-implemented method of claim 14, wherein the first speech is not directed to the computing device.

16. A system comprising:
an electronic data store configured to store a plurality of acoustic models; and
one or more computer processors implemented in hardware and in communication with the electronic data store, the one or more computer processors configured to at least:
receive a first signal comprising first speech;
generate first speech recognition results using the first signal and an acoustic model of the plurality of acoustic models, wherein the first speech recognition results comprise a textual transcription of the first speech; and
subsequent to generating the first speech recognition results:
determine a first confidence value associated with the first speech recognition results;
generate a first updated acoustic model based at least in part on the first confidence value associated with the first speech recognition results;
generate second speech recognition results using a second signal and the first updated acoustic model, wherein the second speech recognition results comprise a textual transcription of second speech in the second signal;
determine a second confidence value associated with the second speech recognition results;
determine that the first speech recognition results were generated outside a window; and
generate a second updated acoustic model based at least in part on the second confidence value.

17. The system of claim 16, wherein:
the one or more computer processors are further configured to:
identify a characteristic of a speaker of the first speech included in the first signal; and
select the acoustic model based at least in part on the characteristic of the speaker; and
the characteristic of the speaker is at least one of a gender of the speaker, an identification of the speaker, or an identification of a household of the speaker.

18. The system of claim 16, wherein the one or more computer processors are further configured to:
determine a plurality of confidence values associated with the first speech recognition results; and
generate the first updated acoustic model based at least in part on the plurality of confidence values.

19. The system of claim 18, wherein:
each confidence value of the plurality of confidence values is associated with a respective portion of the first speech recognition results; and the first updated acoustic model is generated based on only the portions of the first speech recognition results whose respective confidence values satisfy a threshold.

20. The system of claim 16 further comprising a remote computing device in communication with the one or more computer processors, and wherein:
the one or more computer processors are further configured to:
determine that the first signal comprises the first speech; and
transmit at least a portion of the first signal to the remote computing device; and
the remote computing device is configured to:
determine that the portion of the first signal comprises the first speech.

21. The system of claim 16, wherein the one or more computer processors are further configured to receive the first signal by performing an endpointing operation on an output of a microphone.

22. The system of claim 16, wherein the first speech is not directed to the system.

23. The system of claim 16, wherein the one or more computer processors are further configured to determine that the first signal comprises the first speech by applying a classification algorithm.

24. The system of claim 16, wherein the one or more computer processors are configured to determine the first confidence value based at least in part on at least one of:
a level of background noise;
a volume of the first speech included in the first signal;
a duration of the first speech included in the first signal; or
probability scores associated with the first textual transcription of the first signal.

25. The system of claim 16, wherein the one or more computer processors are configured to generate the first updated acoustic model based at least in part on the first confidence value associated with the first speech recognition results by:
generating a weight based on the confidence value associated with the first speech recognition results; and
generating the first updated acoustic model by using the weight to adjust a Gaussian distribution of the acoustic features of the acoustic model.

26. The system of claim 25, wherein the one or more computer processors are further configured to generate the first updated acoustic model by using a maximum likelihood linear regression technique, a maximum mutual information technique, a boosted maximum mutual information technique, a minimum classification error technique, or a minimum phone error technique.

27. The system of claim 25, wherein the one or more computer processors are configured to generate the first updated acoustic model by using the weight to adjust the Gaussian distribution of the acoustic features of the acoustic model by:
determining acoustic features of a sound unit represented in the first signal;
determining a Gaussian distribution of the acoustic features of the sound unit;
determining a mean of the Gaussian distribution of the acoustic features of the sound unit;
determining a difference between the mean of the Gaussian distribution of the acoustic features of the sound unit and a mean of the Gaussian distribution of acoustic features associated with the acoustic model; and
adjusting the mean of the Gaussian distribution of acoustic features of the acoustic model based on the weight and the difference between the mean of the Gaussian distribution of acoustic features of the sound unit and the mean of the Gaussian distribution of acoustic features associated with the acoustic model.

28. The system of claim 25, wherein the acoustic features of the sound unit comprise energies of a frame of speech in the first signal over a plurality of frequency bands.

29. The system of claim 25, wherein:
the acoustic model further comprises one or more hidden Markov models representative of one or more sound units;
a state of a hidden Markov model of the one or more hidden Markov models is represented as a Gaussian mixture model comprising a linear combination of a plurality of Gaussian distributions; and
the Gaussian distribution of the acoustic features associated with the acoustic model is included in the plurality of Gaussian distributions.

30. The system of claim 16, wherein the one or more computer processors are further configured to discard the first speech recognition results in response to determining that the first speech recognition results were generated outside the window.

31. The system of claim 16, wherein:
the window corresponds to a set of recent speech recognition results;
the set of recent speech recognition results do not comprise the first speech recognition results; and
the set of recent speech recognition results comprise the second speech recognition results.

32. A non-transitory computer-readable medium comprising one or more computer-executable modules, the one or more computer-executable modules configured to cause a computer processor implemented in hardware to at least:
receive a first signal comprising first speech;
generate first speech recognition results using the first signal and a first acoustic model, wherein the first speech recognition results comprise a textual transcription of the first speech; and
subsequent to generating the first speech recognition results:
determine one or more first confidence values associated with the first speech recognition results,
generate a second acoustic model based at least in part on the one or more first confidence values associated with the first speech recognition results, and
generate second speech recognition results using a second signal and the second acoustic model, wherein the second speech recognition results comprise a textual transcription of second speech in the second signal; and
subsequent to generating the second speech recognition results:
determine one or more second confidence values associated with the second speech recognition results,
determine that the first speech recognition results were generated outside a window, and
generate a third acoustic model based at least in part on the one or more second confidence values.

33. The non-transitory computer-readable medium of claim 32, wherein the first acoustic model comprises a Gaussian mixture model.

34. The non-transitory computer-readable medium of claim 33, wherein the Gaussian mixture model comprises one or more Gaussian distributions, and wherein the second acoustic model is generated at least in part by modifying at least one of means of the one or more Gaussian distributions.

35. The non-transitory computer-readable medium of claim 33, wherein the Gaussian mixture model comprises one or more Gaussian distributions, and wherein the second acoustic model is generated at least in part by modifying at least one of variances of the one or more Gaussian distributions.

36. The non-transitory computer-readable medium of claim 32, wherein the second acoustic model is generated by applying a transformation matrix to the first acoustic model.

37. The non-transitory computer-readable medium of claim 32, wherein the one or more computer-executable modules are further configured to cause the computer processor to generate the first speech recognition results using the first signal and the first acoustic model by:
identifying a characteristic of a speaker of the first speech;
selecting the first acoustic model based at least in part on the characteristic; and
generating the first speech recognition results using the first signal and the first acoustic model.

38. The non-transitory computer-readable medium of claim 32, wherein the first speech is not directed to a computing device.

* * * * *